UNITED STATES PATENT OFFICE.

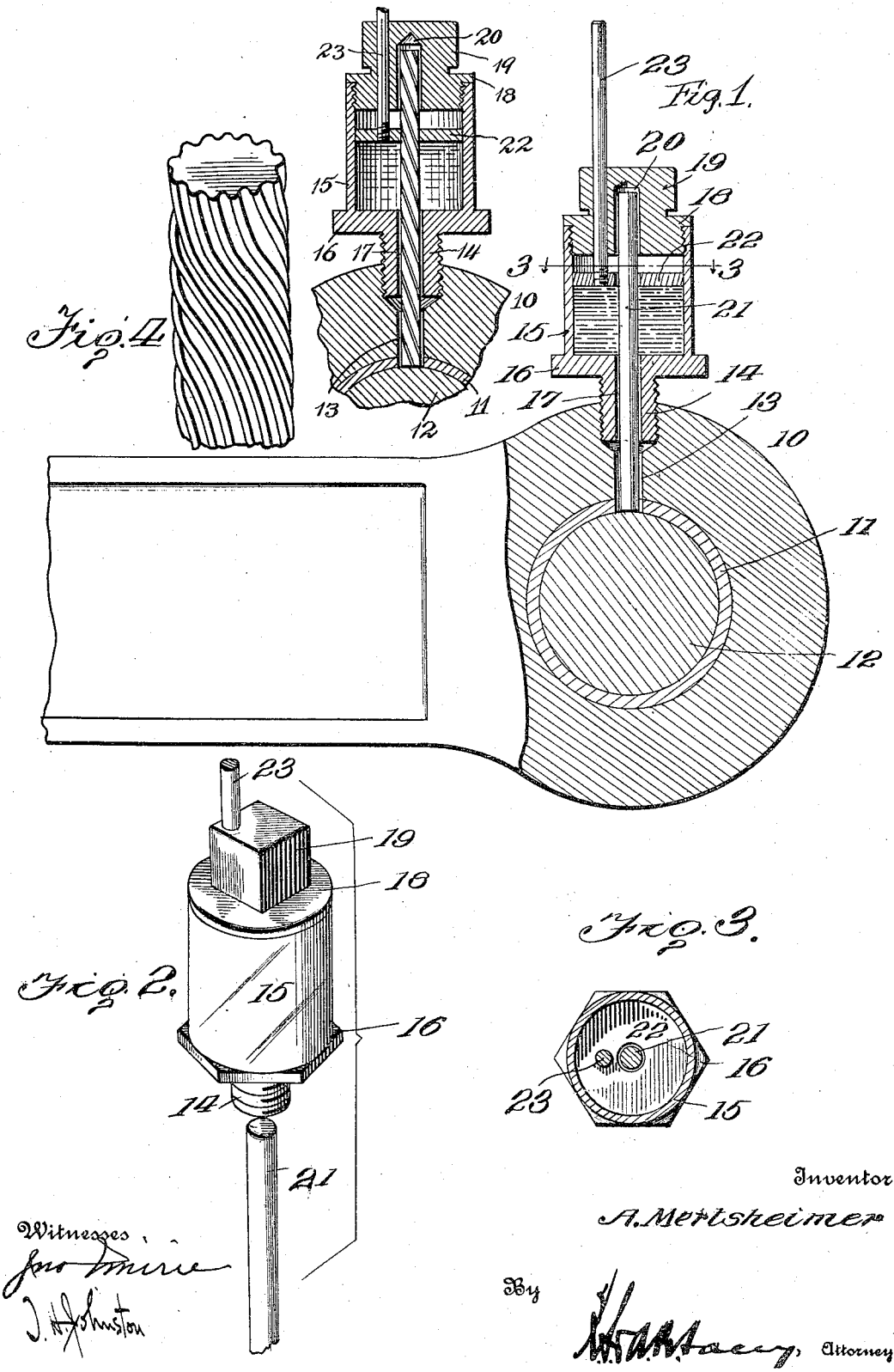

AUGUSTUS MERTSHEIMER, OF SALT LAKE CITY, UTAH.

AUTOMATIC LUBRICATOR.

1,139,697.   Specification of Letters Patent.   Patented May 18, 1915.

Application filed June 2, 1914. Serial No. 842,485.

*To all whom it may concern:*

Be it known that I, AUGUSTUS MERTS-HEIMER, citizen of the United States, residing at Salt Lake City, in the county of Salt Lake and State of Utah, have invented certain new and useful Improvements in Automatic Lubricators, of which the following is a specification.

This invention relates to automatic lubricators and more particularly to an improved device of this character especially adapted for use in connection with bearings which are arranged to move or rotate with reference to the journal engaged by the bearing, although the construction may be employed in any other suitable adaptation.

The invention has as its primary object to provide a lubricator embodying thermostatic means for causing the positive and even feeding of the lubricant to the journal and including an indicator so arranged that the quantity of lubricant within the cup of the lubricator may be readily determined.

The invention has as a further object to provide a lubricator of the above described character wherein the indicator is so constructed and arranged that said indicator may be manually actuated to cause the lubricant contained within the cup of the lubricator to be positively fed to the bearing.

A further object of the invention is to provide an automatic lubricator employing a thermostatic element of such construction that the overheating of the lubricant contained within the cup of the lubricator will be avoided, while at the same time, providing means whereby the lubricant may, under all conditions, be caused to be properly fed to the journal. And a still further object of the invention is to provide a lubricator composed of few and simple parts and of such construction that it may be readily applied to bearings as now in common use.

With these and other objects in view my invention will be more fully described and illustrated in the accompanying drawings and then specifically pointed out in the claims which are attached to and form a part of this application.

In the accompanying drawings:—Figure 1 is a vertical sectional view showing my improved lubricator applied to a bearing of conventional type. Fig. 2 is a detail perspective view showing the lubricator detached, and illustrating the thermostatic rod employed, as withdrawn from the cup of the lubricator, said rod being partly broken away and being illustrated in proper relative position. Fig. 3 is a horizontal sectional view taken on the line 3—3 of Fig. 1, and Fig. 4 is a fragmentary sectional view, illustrating a slight modification of the invention.

Corresponding and like parts are referred to in the following description and indicated in all the views of the drawings by the same reference characters.

For the purposes of convenience, I have shown in Fig. 1 of the drawings, my improved lubricator applied, wherein the numeral 10 indicates a bearing formed by one extremity of a conventional type of crank arm, the bearing being provided with the usual bushing 11 and supporting the journal 12 of ordinary construction.

Formed in the bearing 10 and extending radially of the journal 12 is a suitable aperture 13 which is enlarged adjacent the outer wall of the bearing and is interiorly screw threaded to engage the screw threaded plug 14 of the lubricator cup 15. The cup 15 may be constructed of any suitable material, being preferably cylindrical as shown, and is provided with a base 16 on which the plug 14 is formed. The plug 14 is centrally bored as at 17, said bore communicating with the interior of the cup and the aperture 13 formed in the bearing, in the operative position of the cup, the aperture 13 in turn opening at its inner extremity upon the interior of the bearing. Communication is thus established between the interior of the cup 15 and the journal 12.

The cup 15 is interiorly screw threaded adjacent its upper extremity to receive an exteriorly screw threaded cap 18 which is preferably formed with a reduced head 19, the head 19 being provided with flat side faces to receive a wrench or other tool. Centrally formed in the cap 18 and opening upon the inner face thereof is a longitudinally extending recess 20 which extends for a portion of its length within the head 19 of the cap.

Mounted within the cup 13 and arranged to extend through the bore 17 of the plug 14 and through the aperture 13 formed in the bearing 10 to rest at its adjacent extremity upon the journal 12 is a thermostatic element preferably in the form of a rod 21 which is preferably of such length as to extend at its outer extremity well within the recess 20 formed in the cap 18.

The rod 21 is of such diameter as to fit loosely within the bore 17 and the aperture 13 formed in the bearing so as to permit lubricant contained within the cup 15 to flow to the journal 12 and it will be observed that said rod is of such length as to extend exteriorly of the cup 15 when the cap 18 is removed therefrom. Thus, when it is desired to remove the rod 21, the upper projecting extremity thereof may be readily grasped and since, under normal conditions, when the cap is applied, the upper extremity of the rod 21 is housed within the recess 20 formed in the cap, said upper extremity of the rod will be free from grease and may consequently, be easily grasped. It is also to be noted that in thus arranging the upper extremity of the rod 21 to seat within the cap 18, the rod is maintained in proper alinement within the bore 17 and the aperture 13 formed in the bearing.

The rod 21 is thus supported to contact with the journal 12 and in the practical use of the device as will be clear, the friction between the parts will cause the rod to heat which will be communicated by the rod to the lubricant contained within the cup 15, causing said lubricant to flow to the journal 12. A positive and steady feeding of the lubricant is thus insured. The rod 21 may be formed of any suitable material but is preferably made of copper since it has been found in practical use that such metal will heat quickly due to frictional contact with the journal, to thus cause the lubricant to flow upon a very few revolutions of the journal 12, but, at the same time, will not heat to such a degree as would cause injury to the lubricant to cause it to become of such consistency as to feed too freely to the journal.

Mounted to slide vertically within the cup 15 is a disk 22 formed from any suitable material which provides a follower, the disk being centrally apertured to receive the rod 21 which forms a guide therefor. A rod 23 having screw threaded engagement with the disk is arranged to extend vertically through a suitable aperture formed in the cap 18 to project normally exteriorly of said cap, and by this construction it will be observed that said rod provides a means for indicating the amount of lubricant contained within the cup, the follower 22 resting normally upon the upper surface of said lubricant. It is also to be noted that the rod 23 is secured to the disk 22 adjacent the periphery thereof and is arranged to extend through the cap 18 upon one side of its axis of rotation. After filling the cup 15, the follower 22 is, of course, first inserted therein and the cap is then applied, and it will be observed that as said cap 18 is turned into engagement with the cup, the follower 22 will be rotated therein around the rod 21 to thus effectually remove the lubricant from the wall of the cup to force it downwardly toward the bottom thereof, this being a very advantageous construction where hard grease is used.

Attention is further called to the fact that the indicator which I provide, said indicator including the follower 22 and the rod 23, may be employed to manually force the lubricant contained within the cup downwardly to be fed to the journal 12. Thus, if for any reason it is desired to have an excess amount of lubricant present upon the journal, this result may be readily accomplished through pressing the indicator downwardly within the cup.

It will thus be seen that I provide a lubricator which is thoroughly automatic in its operation and wherein the feeding of the lubricant is controlled by a thermostatic element. It will also be seen that I provide a construction wherein the amount of lubricant contained within the lubricator is visibly indicated exteriorly thereof and wherein the indicator employed may be manually operated to cause a forced feeding of the lubricant. It will further be seen that the invention is simple in construction and may be readily applied to any ordinary type of suitable journal. While any suitable lubricant may be employed in connection with my improved lubricator, still, the construction is more particularly adapted for lubricants of a more or less viscid character. As will be clear, the rod 21 will distribute the greatest amount of heat within the cup 15 immediately adjacent the base thereof to thus cause a partial melting of the lubricant at such point to feed to the journal 12, while the lubricant contained in the upper part of the cup will not be so greatly affected by the heat of the rod. Hence, the greater portion of the heat communicated by the rod interiorly of the cup will be absorbed immediately upon coming in contact with the lubricant contained in the lower part of the cup. As the lubricant contained in the lower part of the cup is fed to the journal 12, the more solid lubricant contained in the upper part of the cup will sink toward the bottom thereof to come in contact with the rod at the point where the greatest amount of heat is distributed thereby. A constant and even feeding of the lubricant is thus obtained.

While I have indicated above that the disk 22 may be formed of any suitable material, still, it is preferred that such disk be constructed of copper as it has been found in practical use that a copper disk will more readily absorb the heat from the rod 21 and will maintain an even temperature within the entire cup, thus keeping the lubricant at an even temperature and producing a very economical use thereof, while at the same time, as in the instance of the rod 21, a follower constructed of such material will not heat to a degree such as would cause the lubricant contained within the cup to become too fluent. Therefore, the disk 22 provides a second thermostatic element and as will be clear, such construction is of decided advantage in that the economical use of the lubricant is thus insured while at the same time, a steady and efficient feeding of the lubricant to the journal is maintained. In this connection it is desired to state that while I have shown the rod 21 as being smooth, still, said rod may be twisted longitudinally, or corrugated, or may be of any other cross-sectional configuration without in the slightest affecting the efficiency thereof or departing from the spirit of my invention.

Having thus described my invention, what I claim and desire to secure by Letters Patent is:—

1. A lubricator including a cup arranged upon a bearing and adapted to have communication with the journal engaged by the bearing, a thermostatic element mounted in said cup and arranged to contact with the journal, a cap fitting within the outer extremity of the cup and closing the cup, the said cap being provided with a head and having a recess formed therein extending into the head, the said recess freely receiving and entirely inclosing the adjacent upper extremity of said thermostatic element whereby the said cap will receive and tend to retain within the cup, heat communicated thereto and rising through the said thermostatic element, and a second thermostatic element surrounding said first mentioned element and longitudinally movable thereon.

2. A lubricator including a cup arranged upon a bearing and adapted to have communication with the journal engaged by the bearing, a thermostatic element mounted in said cup, said element including a rod having slidable connection with the cup and arranged to contact with said journal, a cap carried by the cup, said cap being recessed to receive the adjacent extremity of said rod and providing a guide therefor, and a lubricant indicator mounted for vertical movement within the cup, said indicator being slidably mounted upon said rod and having slidable connection with said cap.

3. A lubricator including a cup arranged upon a bearing and adapted to have communication with the journal engaged by the bearing, a rod detachably connected with the cup, said rod being arranged to contact with the journal and disposed to extend through the cup to project exteriorly thereof, a cap carried by the cup and having free connection with said rod, said cap being adapted to form a housing for the projecting extremity of the rod and providing a guide therefor, and a lubricant indicator slidably mounted within the cup and having slidable connection with said cap.

4. A lubricator including a cup arranged upon a bearing and adapted to have communication with the journal engaged by the bearing, a thermostatic element disposed to extend within the cup and arranged to contact with the journal, a guide for the outer extremity of said element, said guide forming a closure for the cup and a housing for the outer extremity of said element, and a lubricant indicator arranged for vertical movement within the cup and having slidable connection with said element, said indicator including a rod projecting normally exteriorly of the cup and having slidable connection with said guide.

5. A lubricator including a cup arranged upon a bearing and adapted to have communication with the journal engaged by the bearing, a thermostatic element having free connection with the cup, said element including a rod arranged to contact with the journal and disposed to extend within the cup, a cap carried by the cup, and a lubricant indicator detachably connected to the cup, said indicator including a disk arranged for vertical movement within the cup and having an aperture formed therein to receive said rod, and a rod having detachable connection with said disk and arranged to extend through said cap, said rod projecting normally exteriorly of the cap.

6. A lubricator including a cup arranged upon a bearing and adapted to have communication with the journal engaged by the bearing, a thermostatic element having free connection with the cup and arranged to contact with the journal, said element being disposed to extend within the cup, a cap carried by the cup, and a lubricant indicator arranged for vertical movement within the cup and having slidable connection with said element, said indicator being arranged to extend normally exteriorly of the cup and having slidable connection therewith, being adapted to cause the expulsion of the lubricant contained within the cup to feed to the journal upon the movement of said indicator in one direction.

7. A lubricator including a cup arranged upon a bearing and adapted to have communication with the journal engaged by the bearing, a thermostatic element having free connection with the cup and arranged to contact with the journal, said element being disposed to extend within the cup, a cap having screw threaded engagement with the cup, and a lubricant indicator detachably connected to the cup, said indicator including a disk arranged for vertical movement within the cup and having slidable connection with said thermostatic element, and a rod connected at one extremity to said disk adjacent the periphery thereof, said rod being arranged to extend through the cap and having slidable connection therewith whereby the disk when operatively connected to the cap is caused to be rotated around said thermostatic element upon the application of the cap to the cup.

8. A lubricator including a cup arranged upon a bearing and adapted to have communication with the journal engaged by the bearing, a cap closing one end of the cup, a thermostatic element arranged within the cup and having one extremity thereof operatively supported by said cap, the opposite extremity of said element being arranged to contact with the journal, a follower arranged for vertical movement within the cup upon said thermostatic element, and a rigid indicating rod detachably connected to the follower and extending through said cap exteriorly of the cup, said rod having free connection with the cap.

9. A lubricator including a cup arranged upon a bearing and adapted to have communication with the journal engaged by the bearing, a thermostatic element of copper mounted in said cup and arranged to contact with the journal, and a second thermostatic element of copper mounted within the cup upon said first mentioned element and arranged to coact therewith, said second thermostatic element being movable within the cup independently of said first mentioned thermostatic element.

10. A lubricator including a cup arranged upon a bearing and adapted to have communication with the journal engaged by the bearing, a twisted rod adapted to be mounted in said cup to contact with the journal, said rod providing a thermostatic element, and a second thermostatic element, constituting a follower, mounted for vertical movement within the cup upon said rod.

11. A lubricator including a receptacle arranged upon a bearing and adapted to have communication with a journal engaged by the bearing, a thermostatic element mounted in said receptacle and arranged to contact with the journal, and a second thermostatic element mounted for independent movement within the receptacle upon said first mentioned element and arranged to coact therewith.

12. A lubricator including a receptacle arranged upon a bearing and adapted to have communication with a journal engaged by the bearing, a thermostatic element mounted in said receptacle and arranged to contact with the journal, and a second thermostatic element arranged to coact with said first mentioned thermostatic element and constituting an indicator.

13. A lubricator including a receptacle arranged upon a bearing and adapted to have communication with a journal engaged by the bearing, a thermostatic element mounted within the receptacle and arranged to contact with the journal, and a second thermostatic element mounted for sliding movement upon said first mentioned thermostatic element and arranged to coact therewith, said second mentioned thermostatic element providing means whereby grease contained within the receptacle may be positively fed to the journal.

In testimony whereof I affix my signature in presence of two witnesses.

AUGUSTUS MERTSHEIMER. [L. S.]

Witnesses:
MATHONIHAH THOMAS,
HARRY I. MIERS.